(12) United States Patent
Murayama

(10) Patent No.: US 9,650,075 B2
(45) Date of Patent: May 16, 2017

(54) VEHICLE FRONT SECTION STRUCTURE

(71) Applicant: TOYOTA JIDOSHA KABUSHIKI KAISHA, Toyota-shi (JP)

(72) Inventor: Kenichi Murayama, Kumagaya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/919,098

(22) Filed: Oct. 21, 2015

(65) Prior Publication Data
US 2016/0121934 A1    May 5, 2016

(30) Foreign Application Priority Data

Oct. 31, 2014   (JP) ................. 2014-223676

(51) Int. Cl.
*B62D 21/15* (2006.01)
*B62D 25/08* (2006.01)
*B60R 19/34* (2006.01)

(52) U.S. Cl.
CPC ......... *B62D 21/152* (2013.01); *B62D 25/082* (2013.01); *B60R 19/34* (2013.01)

(58) Field of Classification Search
CPC ...... B60R 19/34; B62D 21/15; B62D 21/152; B62D 25/08; B62D 25/082
USPC .................. 296/187.09, 187.1, 203.02, 205
See application file for complete search history.

(56) References Cited

U.S. PATENT DOCUMENTS

| | | | |
|---|---|---|---|
| 9,233,714 B2 * | 1/2016 | Hara ................. | B62D 21/09 |
| 2013/0241233 A1 | 9/2013 | Ohnaka et al. | |
| 2013/0320709 A1 | 12/2013 | Kuwabara et al. | |
| 2014/0354008 A1 * | 12/2014 | Sakakibara ......... | B62D 25/082 |
| | | | 296/187.1 |
| 2015/0191203 A1 * | 7/2015 | Okamoto ............ | B60R 19/02 |
| | | | 296/187.1 |
| 2016/0101751 A1 * | 4/2016 | Bou ................... | B62D 21/152 |
| | | | 293/133 |

FOREIGN PATENT DOCUMENTS

| | | | |
|---|---|---|---|
| JP | 11-20733 A | 1/1999 | |
| JP | 11-348824 A | 12/1999 | |
| JP | 2003-95135 A | 4/2003 | |
| JP | 2010-70133 A | 4/2010 | |
| JP | 2012-228907 | 11/2012 | |
| JP | 2013-193571 | 9/2013 | |
| JP | 2013-203320 | 10/2013 | |
| JP | WO 2014192176 A1 * | 12/2014 | ........... B62D 21/152 |

\* cited by examiner

*Primary Examiner* — Jason S Daniels
(74) *Attorney, Agent, or Firm* — Oblon, McClelland, Maier & Neustadt, L.L.P.

(57) ABSTRACT

A vehicle front section structure includes a front side member including an inner wall and an outer wall facing each other in a vehicle width direction; a load receiving section that is provided or formed at a vehicle front-rear direction front end portion of the front side member, and that receives load; and a weakened portion that is formed at least in the inner wall and the outer wall, at a location that is rear side in a vehicle front-rear direction of the front side member than the load receiving section, and that has lower rigidity than the rigidity of other locations in the front side member.

5 Claims, 11 Drawing Sheets

VEHICLE FRONT SECTION STRUCTURE

CROSS-REFERENCE TO RELATED APPLICATION

This application is based on and claims priority under 35 USC 119 from Japanese Patent Application No. 2014-223676, filed on Oct. 31, 2014, the disclosure of which is incorporated by reference herein.

BACKGROUND

Technical Field

The present disclosure relates to a vehicle front section structure.

Related Art

Japanese Patent Application Laid-Open (JP-A) No. 2013-203320 describes a vehicle front section structure in which a vehicle width direction outer face of a front side frame is formed with a bead that is weaker than other locations. In other words, the vehicle front section structure is configured such that, in a collision, the front side frame is bent toward the vehicle width direction inner side at the location formed with the bead, due to forming the bead only on the vehicle width direction outer face.

However, since the related art described above is a structure in which the front side frame is bent toward the vehicle width direction inner side at the location formed with the bead, energy is not readily absorbed in the vehicle front-rear direction in a collision. There is accordingly room for improvement in increasing the amount of energy absorbed by a front side member in a collision.

SUMMARY

In consideration of the above circumstances, the present disclosure provides a vehicle front section structure capable of increasing the amount of energy absorbed by a front side member in a collision.

Solution to Problem

A first aspect of the present disclosure is a vehicle front section structure including: a front side member including an inner wall and an outer wall facing each other in a vehicle width direction; a load receiving section that is provided or formed at a vehicle front-rear direction front end portion of the front side member, and that receives load; and a weakened portion that is formed at least in the inner wall and the outer wall, at a location that is rear side in a vehicle front-rear direction of the front side member than the load receiving section, and that has lower rigidity than the rigidity of other locations in the front side member.

In the first aspect, the weakened portion is formed to the rear side of the load receiving section. Energy of collision load applied to the load receiving section is thereby absorbed by deformation of the weakened portion. The weakened portion is formed to the inner wall as well as the outer wall of the front side member. This facilitates crushing of the weakened portion in the vehicle front-rear direction in a collision, thereby facilitating absorption of collision energy. Absorbing energy in the vehicle front-rear direction from the time of the collision, and facilitating energy absorption in this manner enables the amount of energy absorbed by the front side member in a collision to be increased.

A second aspect of the disclosure is a vehicle front section structure of the first aspect, further including a reinforcement portion having higher rigidity than the rigidity of the weakened portion and that is disposed at a location that is rear side in the vehicle front-rear direction of the front side member than the weakened portion.

In the second aspect, the rigidity of the reinforcement portion is higher than the rigidity of the weakened portion. Accordingly, when collision load acts on the reinforcement portion, the reinforcement portion itself is not readily compressed, such that the front side member folds at a boundary portion between the reinforcement portion and other locations. Namely, in a collision, the front side member folds at the location provided with the reinforcement portion, following energy absorption by the weakened portion. The front side member can accordingly be folded at a set location due to providing the reinforcement portion that has higher rigidity than the weakened portion further to the rear side than the weakened portion.

A third aspect of the present disclosure is a vehicle front section structure of the second aspect, wherein the reinforcement portion is a plate member straddling from the inner wall to the outer wall.

In the third aspect, the plate member is disposed from the inner wall to the outer wall of the front side member, thereby utilizing the entire cross-section of the front side member as a load transmission path. This thereby enables load to be stably transmitted toward the rear of the front side member regardless of the collision mode of the vehicle, such as a small overlap collision or a head-on collision.

A fourth aspect of the present disclosure is a vehicle front section structure of the second aspect, wherein: the load receiving section has a greater width in the vehicle width direction than the front side member; and the reinforcement portion includes a contact member that projects out from the outer wall to a vehicle width direction outer side, and that contacts the load receiving section in a collision.

In the fourth aspect, the contact member projects out further to the outer side than the outer wall of the front side member. Accordingly, even when a crushed location of the front side member protrudes out further to the outside than the original position of the outer wall in a collision, the crushed location still contacts the contact member. The contact member is configured by the reinforcement member that has higher rigidity than other locations, and so is not readily compressed. A fold accordingly occurs in the front side member at the location provided with the contact member. Namely, providing the contact member promotes folding of the front side member at the reinforcement portion, and thereby enables more reliable folding of the front side member.

A fifth aspect of the present disclosure is a vehicle front section structure of the fourth aspect, wherein the load receiving section is disposed at the vehicle width direction outer side of the outer wall, and includes a gusset formed in a trapezoidal shape in plan view with an upper base at a vehicle front-rear direction rear side, and a lower base at a vehicle front-rear direction front side.

In the fifth aspect, the length of the load receiving section in the vehicle front-rear direction can be set shorter than in cases in which a gusset with a triangular shape in plan view is employed as the load receiving section. This thereby enables a reduction in weight of the vehicle front section structure in comparison to cases in which a gusset with a triangular shape in plan view is employed as the load receiving section.

A sixth aspect of the present disclosure is a vehicle front section structure of the first aspect, wherein the load receiving section includes a load receiving member that is formed in a hollow box shape and that is disposed at the front end portion of the front side member.

In the sixth aspect, the load receiving member is attached to the front end portion (vehicle front-rear direction front side) of the front side member. Accordingly, by modifying the vehicle front-rear direction length of the load receiving member, the vehicle front section structure can be attached to various vehicles that include a front side member (for example types with different lengths in the vehicle front-rear direction).

A seventh aspect of the present disclosure is a vehicle front section structure of the first aspect, wherein: the front side member includes a dividing member that respectively divides the inner wall and the outer wall into a front side and a rear side in the vehicle front-rear direction; the weakened portion is formed at the inner wall at the front side and the outer wall at the front side; and a box body is formed by the inner wall at the front side, the outer wall at the front side, the load receiving section, and the dividing member.

In the seventh aspect, the box body including the dividing member is attached to the vehicle front-rear direction front side of the front side member. Accordingly, by modifying the vehicle front-rear direction length of the box body, the vehicle front section structure can be attached to various vehicles that include a front side member (for example types with different lengths in the vehicle front-rear direction).

As described above, the vehicle front section structure of the first aspect enables an increase in the amount of energy absorbed by a front side member in a collision.

The vehicle front section structure of the second aspect enables the front side member to be folded at a set location.

The vehicle front section structure of the third aspect enables load to be stably transmitted toward the rear of the front side member regardless of the collision mode, such as a small overlap collision or a head-on collision.

The vehicle front section structure of the fourth aspect enables more reliable folding of the front side member.

The vehicle front section structure of the fifth aspect enables a reduction in weight of the vehicle front section structure.

The vehicle front section structure of the sixth aspect enables the vehicle front section structure to be attached to various vehicles that include a front side member.

The vehicle front section structure of the seventh aspect enables the vehicle front section structure to be attached to various vehicles that include a front side member.

BRIEF DESCRIPTION OF DRAWINGS

Exemplary embodiments will be described in detail based on the following figures, wherein.

DETAILED DESCRIPTION

First Exemplary Embodiment

Figure 1:
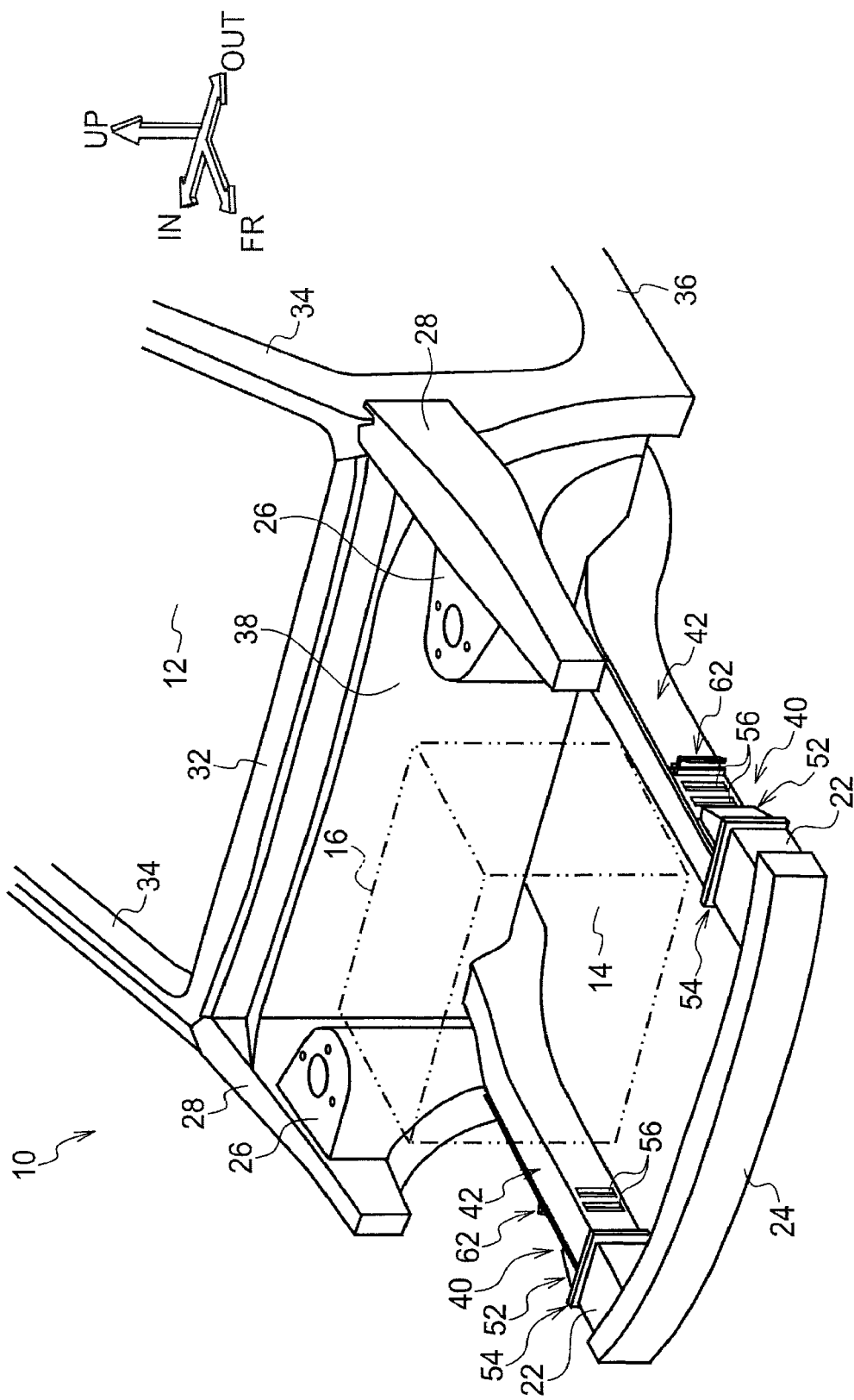
FIG. 1 is a perspective view illustrating main configuration in a front section of a vehicle applied with a vehicle front section structure according to a first exemplary embodiment.

Explanation follows regarding a first exemplary embodiment of a vehicle front section structure with reference to FIG. 1 to FIG. 6. In the drawings, the arrow FR indicates the vehicle front (direction of travel), the arrow UP indicates upward in the vehicle, the arrow OUT indicates the vehicle width direction outer side, and the arrow IN indicates the vehicle width direction inner side, as appropriate. Unless specifically mentioned otherwise, reference simply to the front-rear, up-down, and left-right directions in the following refers to the vehicle front-rear direction, the vehicle up-down direction, and the vehicle width direction, when facing in the direction of travel.

Overall Vehicle Configuration

FIG. 1 illustrates main portions of a vehicle 10 according to the first exemplary embodiment. In the vehicle 10, an engine compartment 14 is formed at a vehicle front-rear direction front side than a cabin 12 (vehicle cabin). A power unit 16 configured including an engine, motor, or the like is housed inside the engine compartment 14. The power unit 16 is illustrated by double-dotted intermittent lines in FIG. 1. Respective vehicle front section structures 40 are provided on both vehicle width direction side portions of a vehicle up-down direction lower section of the engine compartment 14. The vehicle front section structures 40 will be described in detail later.

A pair of left and right front side members 42, described later, are provided at both vehicle width direction side portions of the vehicle up-down direction lower section of the engine compartment 14. Note that since the vehicle 10 and the vehicle front section structures 40 are basically configured with left-right symmetry, illustration of the right side of the vehicle 10 is omitted, with the exception of in FIG. 1, and explanation regarding structures on the right side is omitted. Engine mounts, not illustrated in the drawings, are attached to upper faces of the front side members 42. The power unit 16 is supported on the left and right front side members 42 through the engine mounts.

A crash box 22 (shock absorbing member) is fixed to a front end portion of each front side member 42 through a bracket 54, described later, using a means such as bolt fastening. Bumper reinforcement 24 is fixed to front end portions of the crash boxes 22 using a means such as bolt fastening. The bumper reinforcement 24 spans between the front end portions of the left and right crash boxes 22.

The crash boxes 22 are configured with lower rigidity (bending rigidity) with respect to axial compression load along the vehicle front-rear direction than the front side members 42. The crash boxes 22 are configured to deform when the vehicle 10 is involved in a frontal collision, before the front side members 42 deform, and thereby absorb part of the collision energy.

Frontal collisions include symmetrical collisions in which the collision occurs across the entire front face of the vehicle 10 (full overlap collisions), and asymmetrical collisions in which the collision occurs toward one side of the front face of the vehicle 10 (offset collisions). In the present exemplary embodiment, offset collisions in which the collision occurs to the vehicle front end section at the vehicle width direction outer side of the front side members 42 are referred to as small overlap collisions.

Suspension towers 26 are provided to the vehicle up-down direction upper side (referred to hereafter as the vehicle upper side) of the front side members 42 at both vehicle width direction side portions of the engine compartment 14. Lower end portions of the suspension towers 26 are joined to the respective front side members 42. Note that in the present exemplary embodiment, reference simply to "joining" refers to joining together two members using at least one method of laser welding, spot welding, or fastening with nuts and bolts.

An apron upper member 28 is joined to an upper end portion of each suspension tower 26. Vehicle front-rear direction rear end portions of the apron upper members 28 are joined to both vehicle width direction end portions of a cowl 32. Both vehicle width direction end portions of the cowl 32 are joined to front pillars 34. A front end portion of a rocker 36 is joined to a vehicle up-down direction lower end portion of each front pillar 34. Moreover, a dash panel 38 that partitions (separates) the cabin 12 from the engine compartment 14 is provided at a vehicle lower side of the cowl 32.

In the vehicle 10, a crushable zone is configured further to the vehicle front-rear direction front side than the dash panel 38. The crash boxes 22 and the vehicle front section structures 40 are configured so as to be proactively deformed, absorbing collision energy, in a frontal collision, so as to prevent deformation of the cabin 12.

Configuration of Main Portions

Next, explanation follows regarding the vehicle front section structure 40.

Figure 2:
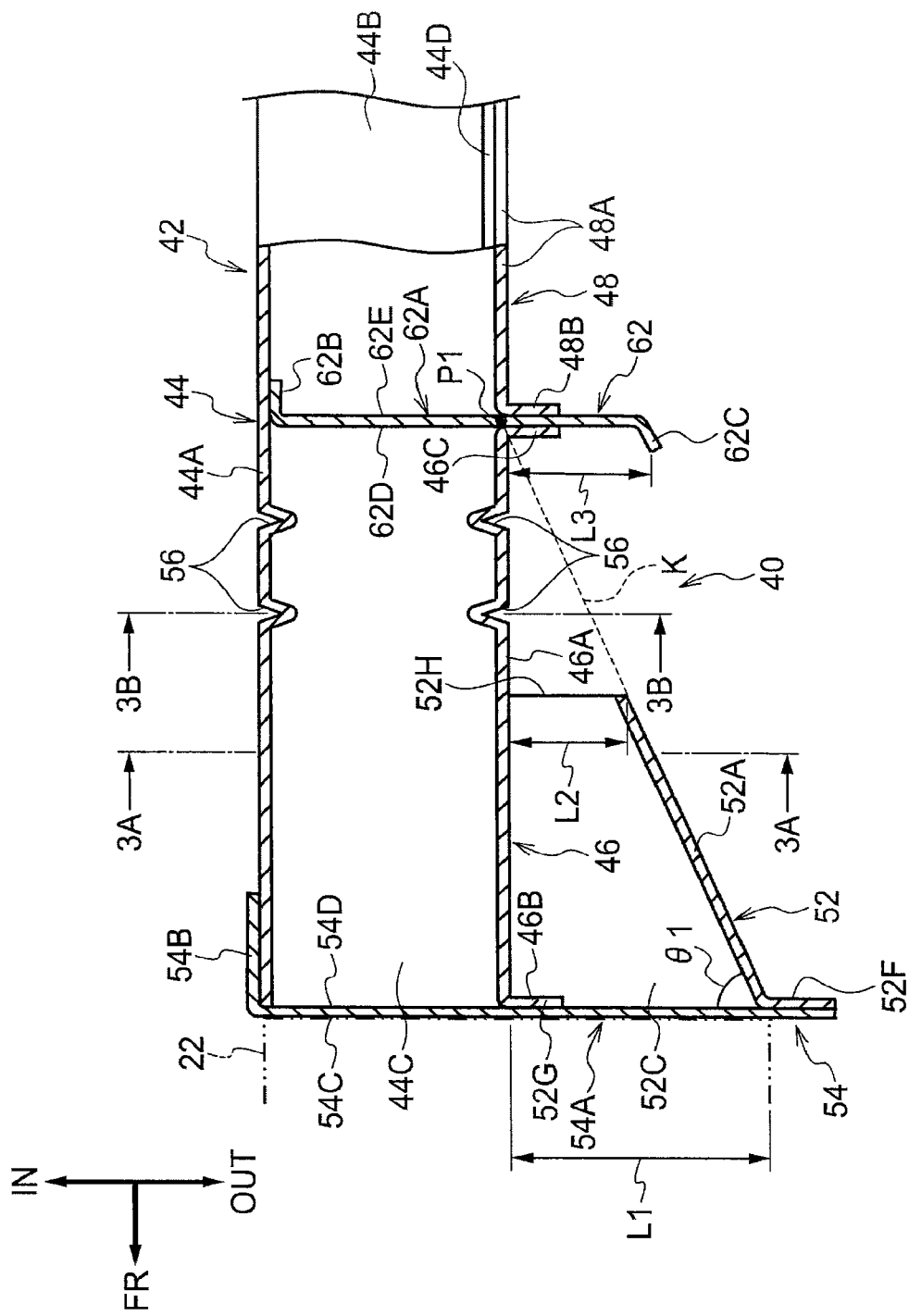
FIG. 2 is a partial horizontal cross-section of a vehicle front section structure according to the first exemplary embodiment.

As illustrated in FIG. 2, the vehicle front section structure 40 according to the first exemplary embodiment includes the front side member 42, a gusset 52 and a bracket 54 collectively serving as a load receiving section, and beads 56 serving as a weakened portion. The vehicle front section structure 40 further includes a bulkhead 62 serving as a reinforcement portion and a contact member.

Front Side Member

As illustrated in FIG. 2, the front side member 42 includes, for example, an inner panel 44 extending along the vehicle front-rear direction, and a first outer panel 46 and a second outer panel 48 positioned on the vehicle width direction outer side of the inner panel 44, and extending along the vehicle front-rear direction. The first outer panel 46 is positioned at the vehicle front-rear direction front side. The second outer panel 48 is positioned at the rear side than the first outer panel 46 in the vehicle front-rear direction. The inner panel 44 is an example of an inner wall. The first outer panel 46 and the second outer panel 48 are examples of outer walls. In FIG. 2, the crash box 22 is illustrated by double-dotted intermittent lines.

Inner Panel

Figure 3A:
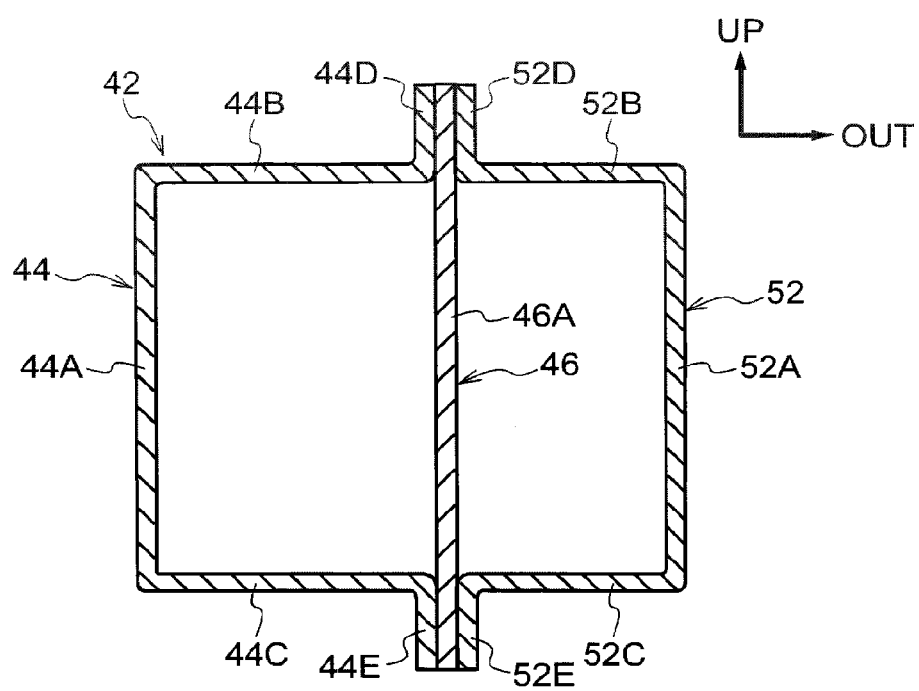
FIG. 3A is an enlarged vertical cross-section taken along line 3A-3A in FIG. 2.

As illustrated in FIG. 3A, the inner panel 44 is formed with a hat shaped cross-section opening toward the vehicle width direction outer side as viewed along the vehicle front-rear direction. Specifically, the inner panel 44 includes an upright wall 44A, an upper wall 44B, a lower wall 44C, an upper flange 44D, and a lower flange 44E.

The upright wall 44A extends along the vehicle up-down direction. The upper wall 44B extends from an upper end portion of the upright wall 44A toward the vehicle width direction outer side. The lower wall 44C extends from a lower end portion of the upright wall 44A toward the vehicle width direction outer side, and has substantially the same length as the upper wall 44B. The upper flange 44D extends upward from an end portion of the upper wall 44B on the opposite side to the upright wall 44A side. The lower flange 44E extends downward from an end portion of the lower wall 44C on the opposite side to the upright wall 44A side.

Figure 5:
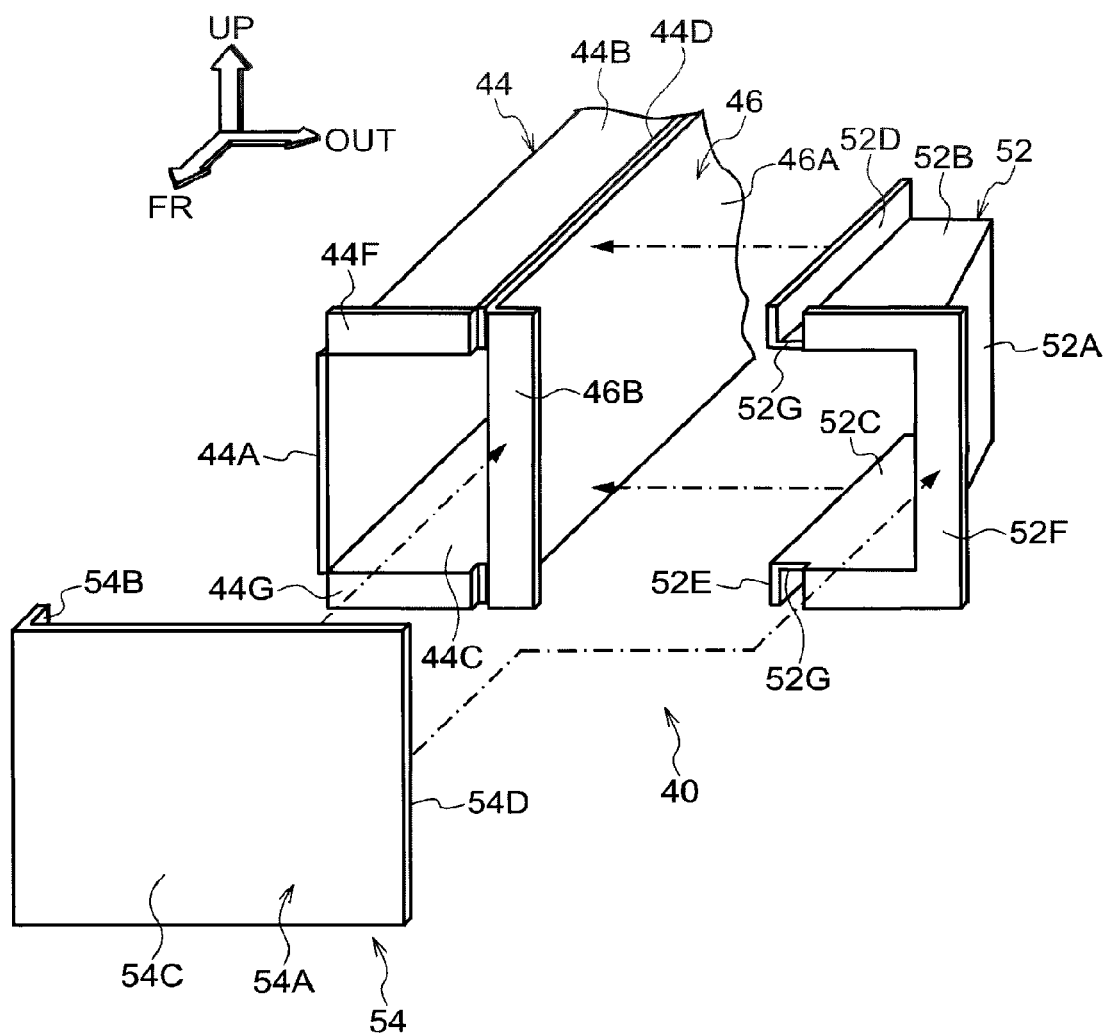
FIG. 5 is a perspective view illustrating a front side member and a gusset of a vehicle front section structure according to the first exemplary embodiment.

As illustrated in FIG. 5, an upper flange 44F and a lower flange 44G are formed at a vehicle front-rear direction front end portion of the inner panel 44. The upper flange 44F extends from a vehicle front-rear direction front end portion of the upper wall 44B toward the vehicle up-down direction upper side. The lower flange 44G extends from a vehicle front-rear direction front end portion of the lower wall 44C toward the vehicle up-down direction lower side. A front face of the upright wall 44A, a front face of the upper flange 44F, and a front face of the lower flange 44G are disposed so as to be aligned substantially in the same plane as each other.

As illustrated in FIG. 2, the beads 56 are formed to the upright wall 44A (inner panel 44) at two locations at an interval in the vehicle front-rear direction, at locations further to the rear side than the gusset 52, and further to the front side than the bulkhead 62, in the vehicle front-rear direction. The gusset 52, the bulkhead 62, and the beads 56 will be explained in detail later.

First Outer Panel

As illustrated in FIG. 2, the first outer panel 46 is configured by an upright wall 46A, a front flange 46B, and a rear flange 46C.

The upright wall 46A is formed in a plate shape with its plate thickness direction in the vehicle width direction. The upright wall 46A faces the upright wall 44A of the inner panel 44 in the vehicle width direction. As illustrated in FIG. 3A, the length in the vehicle up-down direction from a lower end to an upper end of the upright wall 46A is, for example, substantially the same as the length in the vehicle up-down direction of the inner panel 44 from a lower end of the lower flange 44E to an upper end of the upper flange 44D.

As illustrated in FIG. 2, the front flange 46B extends from a vehicle front-rear direction front end portion of the upright wall 46A toward the vehicle width direction outer side. The rear flange 46C extends from a vehicle front-rear direction rear end portion of the upright wall 46A toward the vehicle width direction outer side. Namely, the first outer panel 46 is formed in a U shape opening toward the vehicle width direction outer side in plan view. The lengths of the upright wall 46A, the front flange 46B, and the rear flange 46C in the vehicle up-down direction are substantially the same as each other.

The front flange 46B is joined by welding to a rear face 54D on the vehicle front-rear direction rear side of the bracket 54, described later. The rear flange 46C is joined by welding to a front face 62D of the bulkhead 62, described later.

The beads 56 are formed in the upright wall 46A at two locations at an interval in the vehicle front-rear direction, locations further to the rear side than the gusset 52, and further to the front side than the bulkhead 62, in the vehicle front-rear direction. The beads 56 will be explained in detail later.

Second Outer Panel

As illustrated in FIG. 2, the second outer panel 48 is, for example, configured by an upright wall 48A and a front flange 48B.

The upright wall 48A is formed in a plate shape with its plate thickness direction in the vehicle width direction. The upright wall 48A faces the upright wall 44A of the inner panel 44 in the vehicle width direction. Moreover, the length in the vehicle up-down direction from an upper end to a lower end of the upright wall 48A is, for example, substantially the same as the length in the vehicle up-down direction from the lower end of the lower flange 44E (see FIG. 3A) to the upper end of the upper flange 44D (see FIG. 3A) of the inner panel 44.

The front flange 48B extends from a vehicle front-rear direction front end portion of the upright wall 48A toward the vehicle width direction outer side. Namely, the second outer panel 48 is formed in an L shape in plan view. The front flange 48B is joined, for example, by welding to a rear face 62E of the bulkhead 62, described later.

As illustrated in FIG. 3A, the upper flange 44D and the lower flange 44E of the inner panel 44 are joined by welding to a vehicle up-down direction upper end portion and lower end portion of the first outer panel 46. Similarly, the upper flange 44D and the lower flange 44E are joined by welding to a vehicle up-down direction upper end portion and lower end portion of the second outer panel 48 (see FIG. 2). The inner panel 44 and the first outer panel 46, and the inner panel 44 and the second outer panel 48, thereby form a closed cross-section extending in the vehicle front-rear direction.

Bracket

As illustrated in FIG. 5, the bracket 54 is, for example, configured by an upright wall 54A and a flange 54B. The upright wall 54A is configured by a rectangular plate member as viewed along the vehicle front-rear direction. The flange 54B extends from a vehicle width direction inner end portion of the upright wall 54A toward the vehicle front-rear direction rear side.

The length of the upright wall 54A in the vehicle width direction is a length that covers from the upright wall 44A of the inner panel 44 to a front flange 52F, described later, of the gusset 52 in an assembled state of the inner panel 44, the first outer panel 46, and the gusset 52, also described later. The length of the upright wall 54A in the vehicle up-down direction is a length that covers the upper flange 44F, the lower flange 44G, the front flange 46B, and the front flange 52F in the assembled state of the inner panel 44, the first outer panel 46, and the gusset 52, described later.

A vehicle front-rear direction front side face of the upright wall 54A is referred to as a front face 54C, and a vehicle front-rear direction rear side face of the upright wall 54A is referred to as the rear face 54D. A vehicle front-rear direction rear end portion of the crash box 22 described above (see FIG. 1) is joined to the front face 54C by welding or fastening. The upper flange 44F, the lower flange 44G, the front flange 46B, and the front flange 52F are joined by welding to the rear face MD.

Gusset

As illustrated in FIG. 3A, the gusset 52 is provided at the vehicle width direction outer side of the upright wall 46A of the first outer panel 46. The gusset 52 is formed with a hat shaped cross-section opening toward the vehicle width direction inner side as viewed along the vehicle front-rear direction. Specifically, the gusset 52 is configured by an upright wall 52A, an upper wall 52B, a lower wall 52C, an upper flange 52D, a lower flange 52E, and the front flange 52F (see FIG. 5).

The upright wall 52A is formed in a plate shape along the vehicle up-down direction, and is disposed facing the first outer panel 46 in the vehicle width direction. The upper wall 52B extends from a vehicle up-down direction upper end portion of the upright wall 52A toward the vehicle width direction inner side. The lower wall 52C extends from a lower end portion of the upright wall 52A toward the vehicle width direction inner side, and has substantially the same length as the upper wall 52B. The upper flange 52D extends upward from a vehicle width direction inner end portion of the upper wall 52B. The lower flange 52E extends downward from a vehicle width direction inner end portion of the lower wall 52C.

As illustrated in FIG. 2, as viewed along the vehicle up-down direction in an assembled state, the upright wall 52A of the gusset 52 is disposed in a state angled toward the vehicle width direction inner side on progression from a vehicle width direction outer end portion of the bracket 54 toward the vehicle front-rear direction rear side. Namely, as viewed along the vehicle up-down direction, the upright wall 52A is disposed obliquely, at an angle θ1 with respect to the upright wall 54A of the bracket 54.

When the vehicle front section structure 40 is viewed along the vehicle up-down direction, a position where an extension line K (illustrated by an intermittent line) extending in the oblique direction of the upright wall 52A intersects with a vehicle width direction outer portion of the front side member 42 configures a fold point P1. The fold point P1 is a position set on the front side member 42 to instigate a folding mode, and acts as a deformation origin. In the present exemplary embodiment, the bulkhead 62, described later, is disposed at the fold point P1.

The lower wall 52C of the gusset 52 is, for example, formed in a trapezoidal shape viewed along the vehicle up-down direction, with the vehicle front-rear direction rear end of the lower wall 52C as the upper base, and the vehicle front-rear direction front end as the lower base. Specifically, the front end face and rear end face of the lower wall 52C in the vehicle front-rear direction respectively run along the vehicle width direction, and a vehicle width direction length L2 of the rear end face is shorter than a vehicle width direction length L1 of the front end face. The length L1 is set based on the required width extension amount in the vehicle width direction of a vehicle front-rear direction front end portion of the front side member 42 in a collision. A vehicle width direction inner end face of the lower wall 52C runs along the vehicle front-rear direction. A vehicle width direction outer end face of the lower wall 52C configures an oblique face following the upright wall 52A.

Moreover, a notch 52G is formed at a vehicle width direction inner end portion of a vehicle front-rear direction front end portion of the lower wall 52C. The size of the notch 52G is a size that can accommodate the front flange 46B of the first outer panel 46 as viewed along the vehicle up-down direction. Since the shape of the upper wall 52B (see FIG. 3A) is a similar shape to that of the lower wall 52C, explanation thereof is omitted.

As illustrated in FIG. 5, the front flange 52F is formed at a vehicle front-rear direction front end portion of the gusset 52. The front flange 52F is formed in a U shape, opening toward the vehicle width direction inner side, as viewed along the vehicle front-rear direction. The front flange 52F is not formed at the notches 52G.

Bead

Figure 4:
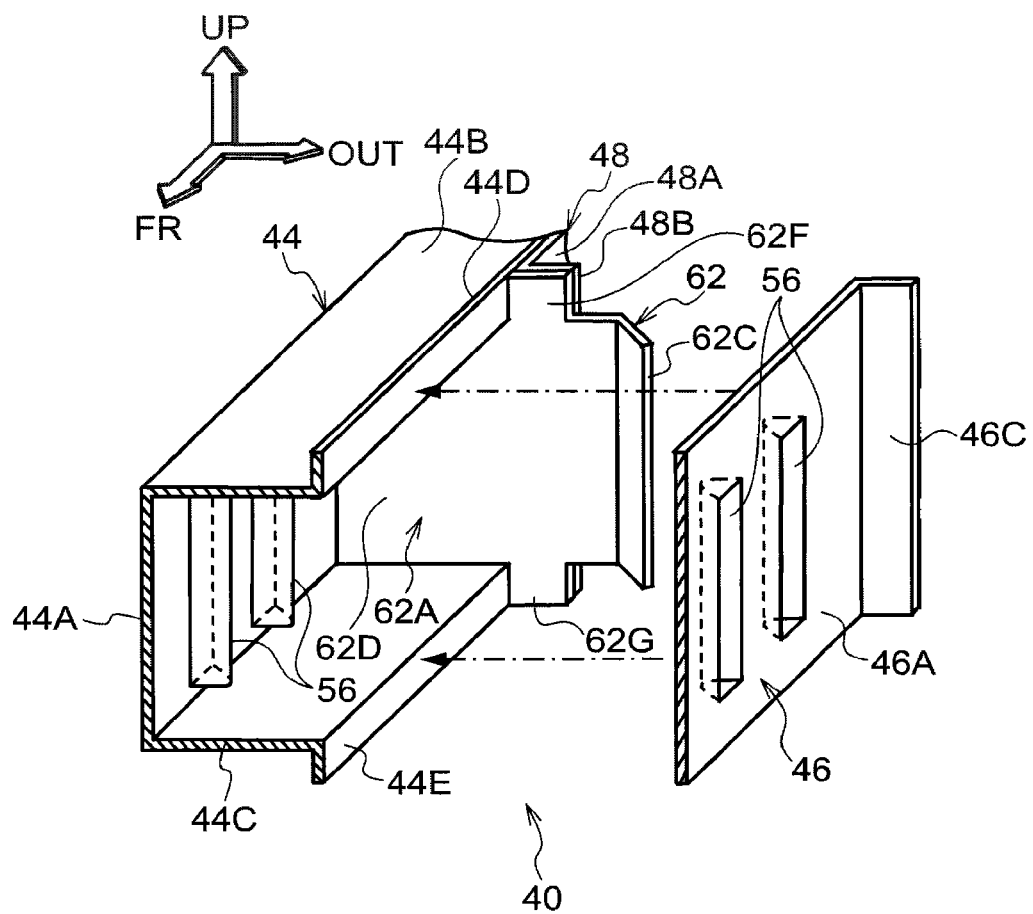
FIG. 4 is a perspective view illustrating indented portions (beads) and a bulkhead of a vehicle front section structure according to the first exemplary embodiment.

As illustrated in FIG. 4, the beads 56 are, for example, formed at two locations in the upright wall 44A of the inner panel 44, and at two locations in the upright wall 46A of the first outer panel 46. Specifically, as illustrated in FIG. 2, each bead 56 is formed further to the rear side than the gusset 52, and further to the front side than the fold point P1 (the position where the bulkhead 62 is disposed), in the vehicle front-rear direction.

As illustrated in FIG. 4, the beads 56 of the inner panel 44 are formed by making a portion of the upright wall 44A to project out toward the vehicle width direction outer side in a substantially V shaped cross-section as viewed along the vehicle up-down direction, forming plural ridge lines extending along the vehicle up-down direction. The beads 56 of the first outer panel 46 are formed by making a portion of the upright wall 46A to project out toward the vehicle width direction inner side in a substantially V shaped cross-section as viewed along the vehicle up-down direction, forming plural ridge lines extending along the vehicle up-down direction. Each of the beads 56 have substantially the same vehicle up-down direction length (height), vehicle front-rear direction length (width), and vehicle width direction length (projection amount) as each other.

The locations of the inner panel 44 and the first outer panel 46 where the beads 56 are formed have lower rigidity (bending rigidity) than the rigidity at other locations of the inner panel 44 and the first outer panel 46. Namely, the locations formed with the beads 56 are weakened with respect to collision load from the vehicle front-rear direction front side. Thus, on receipt of load, the locations formed with the respective beads 56 absorb energy while undergoing deformation.

Figure 3B:
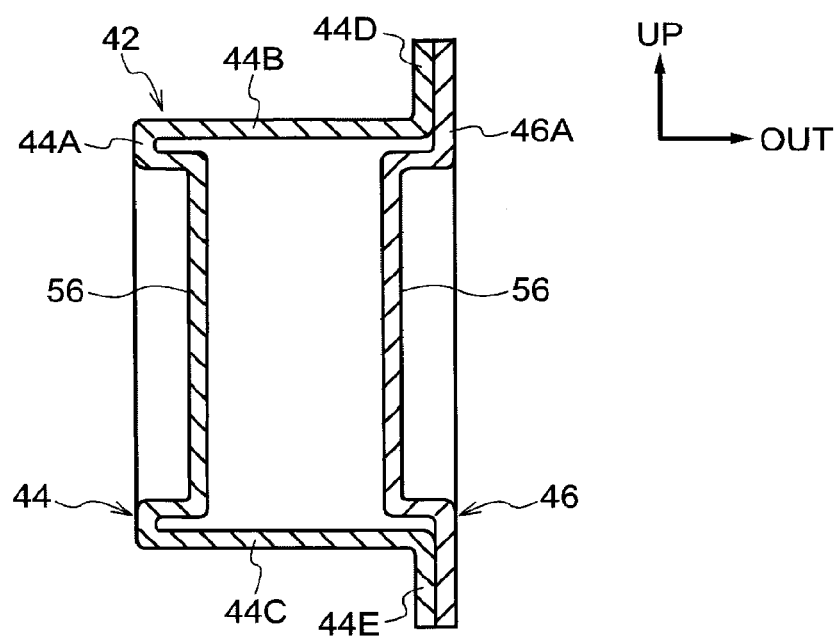
FIG. 3B is an enlarged vertical cross-section taken along line 3B-3B in FIG. 2.

As illustrated in FIG. 2 and FIG. 3B, the beads 56 of the inner panel 44 are, for example, disposed facing the beads 56 of the first outer panel 46 in the vehicle width direction. The placement, shape, and number of the beads 56 is set such that the front side member 42 folds toward the vehicle width direction inner side when collision load is input from the vehicle front-rear direction front side.

There is no limitation to the beads 56 of the inner panel 44 and the beads 56 of the first outer panel 46 facing each other in the vehicle width direction, and they may have a staggered placement in the vehicle front-rear direction. There is no limitation to the shape of the beads 56 of the inner panel 44 being the same shape as the shape of the beads 56 of the first outer panel 46, and they may be configured with different shapes. Moreover, there is no limitation to the number of the beads 56 of the inner panel 44 being the same number as the number of the beads 56 of the first outer panel 46, and there may be different numbers thereof.

Bulkhead

As illustrated in FIG. 2, the bulkhead 62 is provided further to the rear side than the gusset 52 in the vehicle front-rear direction of the front side member 42. The bulkhead 62 is formed by a plate member, and is provided straddling from the upright wall 44A of the inner panel 44 to the upright wall 46A of the first outer panel 46 and the upright wall 48A of the second outer panel 48 in the vehicle width direction.

The bulkhead 62 has a shape that is bent at two locations in the vehicle width direction as viewed along the vehicle up-down direction, and includes an upright wall 62A, a flange 62B, and a bent portion 62C. A vehicle width direction outer end portion of the upright wall 62A, and the bent portion 62C, project out further to the vehicle width direction outer side than the upright wall 46A and the rear flange 46C. The location where the bulkhead 62 is provided to the front side member 42 has higher rigidity than the rigidity (bending rigidity) of the beads 56.

The upright wall 62A is disposed running along the vehicle width direction, with its plate thickness direction in the vehicle front-rear direction. A portion of the front face 62D at the vehicle front-rear direction front side of the upright wall 62A is welded to the rear flange 46C of the first outer panel 46. A portion of the rear face 62E at the vehicle front-rear direction rear side of the upright wall 62A is welded to the front flange 48B of the second outer panel 48.

As illustrated in FIG. 4, the length of the bulkhead 62 in the vehicle up-down direction is a length enabling insertion between the lower wall 44C and the upper wall 44B of the inner panel 44. A joint portion 62F is formed extending toward the vehicle up-down direction upper side, further to the outer side than a vehicle width direction central portion, and at a vehicle up-down direction upper end, of the upright wall 62A. A joint portion 62G, extending toward the vehicle up-down direction lower side, is formed further to the outer side than the vehicle width direction central portion, and at a vehicle up-down direction lower end, of the upright wall 62A. Vehicle width direction inner end portions of the joint portions 62F, 62G contact the upper flange 44D and the lower flange 44E in a state in which the flange 62B (see FIG. 2) is in contact with the inner panel 44.

As illustrated in FIG. 2, the flange 62B extends from a vehicle width direction inner end portion of the upright wall 62A toward the vehicle front-rear direction rear side. The flange 62B is welded to a vehicle width direction outer face of the upright wall 44A.

As viewed along the vehicle up-down direction, the bent portion 62C is angled so as to head toward the vehicle width direction outer side on progression from the vehicle width direction outer end portion of the upright wall 62A toward the vehicle front-rear direction front side. A length L3 from a vehicle front-rear direction front end portion of the bent portion 62C to the upright wall 46A of the first outer panel 46 is longer than the length L2 of the gusset 52. In a collision, a vehicle front-rear direction rear end portion of the gusset 52 is accordingly capable of entering a region bordered by the upright wall 46A, the upright wall 62A, and the bent portion 62C, and capable of contacting the bulkhead 62.

Vehicle Front Section Structure Assembly

As illustrated in FIG. 4, during assembly of the vehicle front section structure 40, for example, the bulkhead 62 is inserted inside the inner panel 44, and the flange 62B (see FIG. 2) is welded to the upright wall 44A. The upright wall 48A of the second outer panel 48 is then welded to the upper flange 44D and the lower flange 44E at the vehicle front-rear direction rear side of the inner panel 44. The front flange 48B is welded to the joint portion 62F and the joint portion 62G.

Then, the first outer panel 46 is disposed at the vehicle front-rear direction front side of the bulkhead 62, and the rear flange 46C is welded to the joint portion 62F, the upright wall 62A, and the joint portion 62G, and the upright wall 46A is welded to the upper flange 44D and the lower flange 44E. The front side member 42 is thus formed.

Then, as illustrated in FIG. 5, the upper flange 52D and the lower flange 52E of the gusset 52 are welded to the upright wall 46A of the first outer panel 46. The upright wall 54A of the bracket 54 is then welded to the upper flange 44F, the lower flange 44G, the front flange 46B, and the front flange 52F. The flange 54B is welded to the upright wall 44A. The vehicle front section structure 40 in formed in this manner. The crash box 22 (see FIG. 1) is attached to the front face 54C of the bracket 54.

Comparative Example

Next, explanation follows regarding a vehicle front section structure 200 of a comparative example. Note that configurations similar to those of the present exemplary embodiment are allocated the same reference numerals, and explanation thereof is omitted. Since the vehicle front section structure 200 of the comparative example is a structure with left-right symmetry in the vehicle width direction, explanation is given regarding the left side in the vehicle width direction, and explanation regarding the right side is omitted.

Figure 11A:
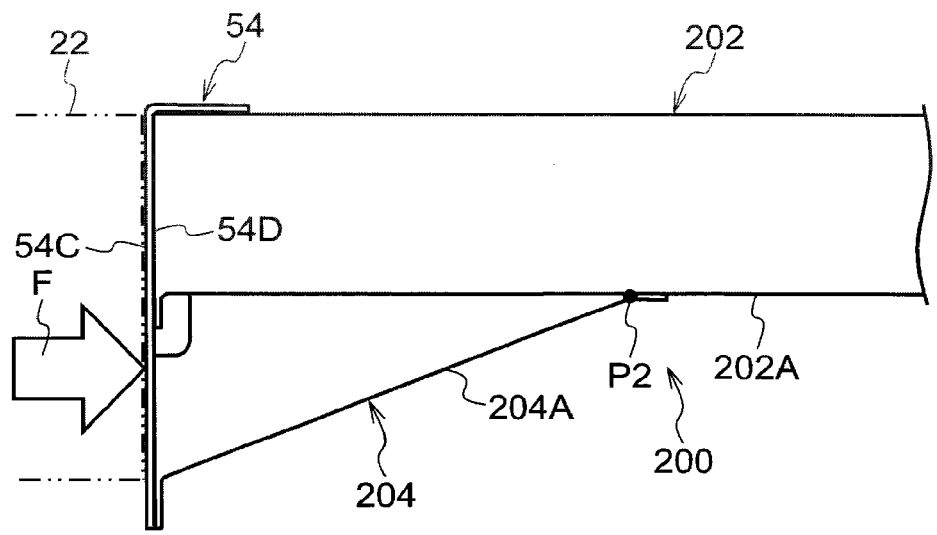
FIG. 11A is an explanatory drawing illustrating a folding state of a front side member in a vehicle front section structure of a comparative example.

FIG. 11A illustrates the vehicle front section structure 200 of the comparative example. The vehicle front section structure 200 of the comparative example includes a front side member 202, a gusset 204 welded to the front side member 202, and a bracket 54 welded to vehicle front-rear direction front end portions of the front side member 202 and the gusset 204.

The front side member 202 is formed in a tube shape and extends along the vehicle front-rear direction. A crash box 22 is attached to a front face 54C of the bracket 54. The crash box 22 is illustrated by double-dotted intermittent lines in FIG. 11A and FIG. 11B.

The gusset 204 is formed with a hat shaped cross-section opening toward the vehicle width direction inner side as taken along the vehicle width direction, and the gusset 204 is formed in the shape of a right angled triangle as viewed along the vehicle up-down direction. Specifically, an oblique wall 204A corresponding to the hypotenuse of the triangle shape of the gusset 204 is welded to a rear face 54D of the bracket 54, and to a side face 202A on the vehicle width direction outer side of the front side member 202. The vehicle front section structure 200 of the comparative example is accordingly set with an end portion position P2 as a fold point on the front side member 202 side of the oblique wall 204A. The section where the oblique wall 204A (gusset 204) is disposed is not formed with a weakened portion that has lower rigidity than other locations of the front side member 202.

Figure 11B:
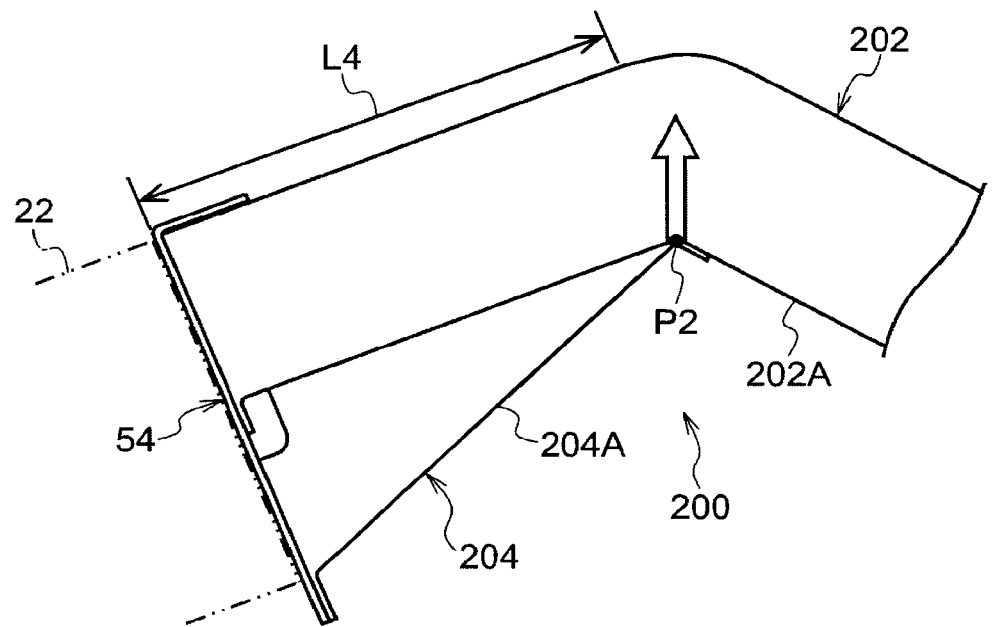
FIG. 11B is an explanatory drawing illustrating a folding state of a front side member in a vehicle front section structure of a comparative example.

In the vehicle front section structure 200 of the comparative example, collision load F is input to the bracket 54 along the vehicle front-rear direction in a small overlap collision. As illustrated in FIG. 11B, in the vehicle front section structure 200 of the comparative example, the bracket 54 and the front side member 202 are connected together by the oblique wall 204A, which is a rigid body. The front side member 202 is not formed with a weakened portion in the section where the oblique wall 204A is disposed (illustrated as the section with length L4 in the vehicle front-rear direction). For this reason, in the vehicle front section structure 200 of the comparative example, during a small overlap collision, axial compression plastic deformation of the front side member 202 does not readily occur in the section where the oblique wall 204A is disposed at a stage prior to folding of the front side member 202 at the fold point P2. It is accordingly difficult to increase the amount of energy absorbed by the front side member 202 in the vehicle front section structure 200 of the comparative example.

Operation and Effects

Next, explanation follows regarding operation and effects of the vehicle front section structure 40 of the first exemplary embodiment.

Figure 6A:
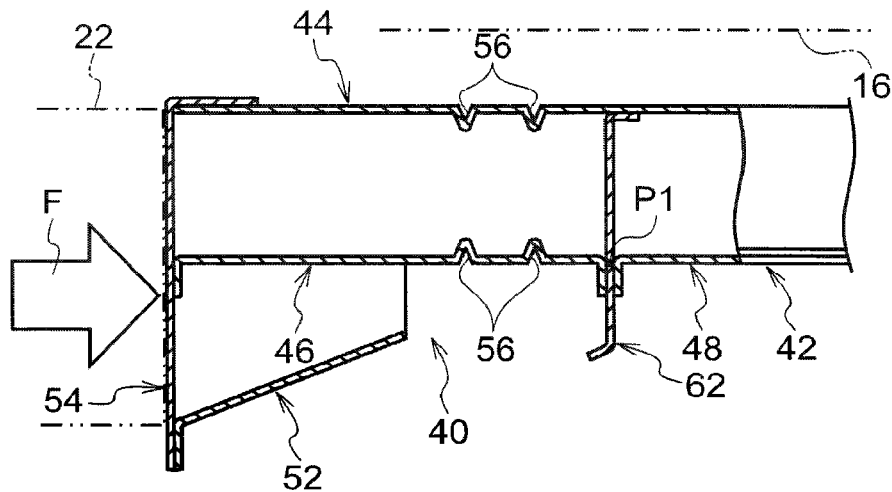
FIG. 6A is an explanatory drawing illustrating a deformation state of a vehicle front section structure according to the first exemplary embodiment in a collision.

As illustrated in FIG. 6A, in the vehicle front section structure 40, in a small overlap collision, the collision load F is input through the crash box 22, further to the vehicle width direction outer side than the front side member 42 in the vehicle width direction of the bracket 54. The collision load F is transmitted to the vehicle front-rear direction rear side of the front side member 42 through the bracket 54, the gusset 52, and the front end portion of the front side member 42. Note that "in a small overlap collision" is paraphrased as "in a collision" in the following explanation.

Figure 6B:
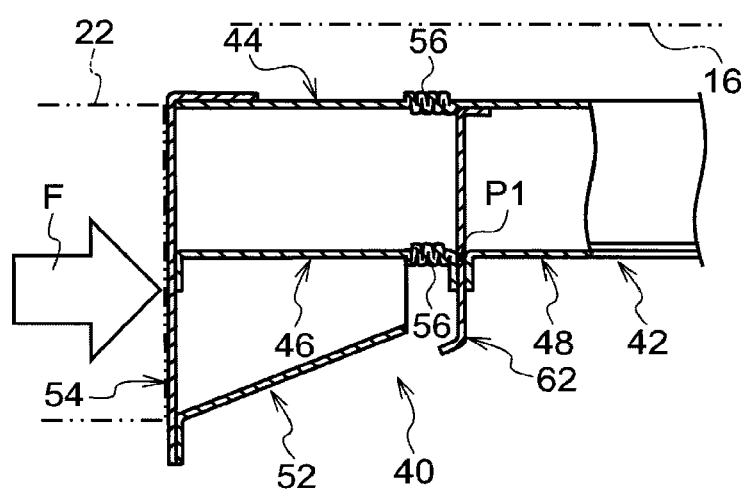
FIG. 6B is an explanatory drawing illustrating a deformation state of a vehicle front section structure according to the first exemplary embodiment in a collision.

The beads 56 are formed at the front side member 42 further to the vehicle front-rear direction rear side than the gusset 52, and further to the vehicle front-rear direction front side than the bulkhead 62 positioned at the fold point P1. As illustrated in FIG. 6B, the front side member 42 accordingly undergoes axial compression plastic deformation (crushing) along the vehicle front-rear direction at the locations formed with the beads 56, absorbing energy of the collision load, prior to the folding mode occurring. Namely, in the vehicle front section structure 40 of the present exemplary embodiment, more energy absorption occurs from the time of the collision than in the comparative example described above.

Moreover, the beads 56 are formed not only to the first outer panel 46, but also to the inner panel 44, of the front side member 42. The beads 56 are accordingly more readily crushed in the vehicle front-rear direction in a collision, facilitating collision energy absorption, in comparison to configurations in which the beads 56 are only formed to the first outer panel 46. The vehicle front section structure 40 accordingly enables the amount of energy absorbed by the front side member 42 in a collision to be increased.

Figure 6C:
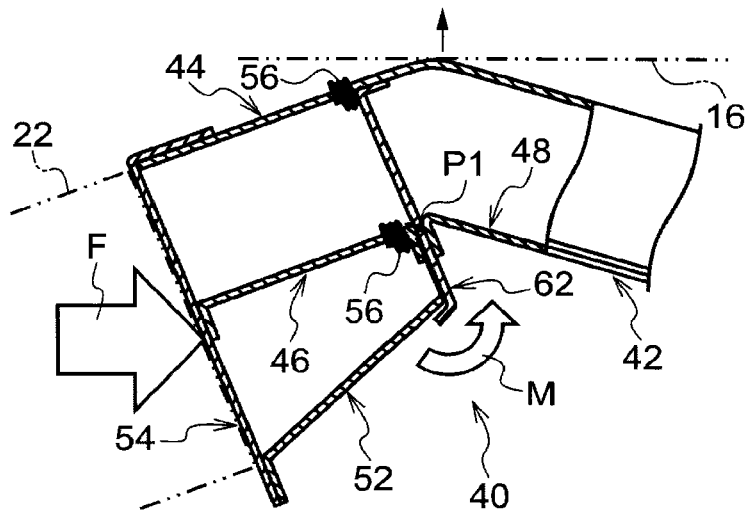
FIG. 6C is an explanatory drawing illustrating a deformation state of a vehicle front section structure according to the first exemplary embodiment in a collision.

Then, as illustrated in FIG. 6C, when plastic deformation of the portion formed with the beads 56 progresses, the vehicle front-rear direction rear end portion of the gusset 52 contacts the bulkhead 62 (catches on the bulkhead 62). In this regard, since the rigidity of the location of the front side member 42 provided with the bulkhead 62 is a higher than the rigidity of other locations of the front side member 42, the bulkhead 62 itself is not readily compressed when collision load acts on the bulkhead 62. The folding mode of the front side member 42 accordingly occurs at a boundary portion between the location of the front side member 42 provided with the bulkhead 62, and other locations of the front side member 42.

Namely, the front side member 42 folds at the location provided with the bulkhead 62 (at the fold point P1) after the vehicle width direction inner side and outer beads 56 absorb energy in a collision. Accordingly, the vehicle front section structure 40 enables the front side member 42 to be folded at a set location due to providing the bulkhead 62 that has higher rigidity than other locations on the front side member 42. Moreover, a bending moment M acts about the position of the vehicle front-rear direction rear end of the gusset 52 at a portion peripheral to the fold point P1, thereby causing the front side member 42 to fold and deform toward the vehicle width direction inner side.

Then, the front side member 42 that has folded and deformed toward the vehicle width direction inner side contacts the power unit 16 (illustrated by double-dotted intermittent lines), thereby transmitting the collision load F toward the vehicle width direction inner side (collision opposite side). Accordingly, in the vehicle 10 illustrated in FIG. 1, the cabin 12 is moved away from a colliding object (not illustrated in the drawings), thereby enabling deformation of the cabin 12 to be prevented.

As illustrated in FIG. 2, in the vehicle front section structure 40, the bulkhead 62 projects out further to the outer side than the upright wall 46A of the front side member 42. Accordingly, even when a crushed location of the front side member 42 protrudes out further to the outer side than the original position of the upright wall 46A in a collision, the crushed location contacts (catches on) the bulkhead 62 that has higher rigidity than other locations. The bulkhead 62 is not readily compressed, as described above. Accordingly, folding of the front side member 42 occurs at the location where the bulkhead 62 is provided.

Accordingly, in the vehicle front section structure 40, folding of the front side member 42 is promoted at the location provided with the bulkhead 62 due to the bulkhead 62 projecting out further to the vehicle width direction outer side than the front side member 42. This thereby enables a folding mode to be more reliably instigated in the front side member 42.

As illustrated in FIG. 2, in the vehicle front section structure 40, the vehicle front-rear direction length of a load receiving section receiving collision load can be set shorter than in cases employing the gusset 204 (see FIG. 11A) that has a triangular shape in plan view, such as in the comparative example described above. Specifically, in plan view of the vehicle front section structure 40, the gusset 52 has no component in a triangular region enclosed by the upright wall 46A, a vehicle front-rear direction rear end face 52H of the gusset 52, and the extension line K. This thereby enables an overall reduction in weight of the vehicle front section structure 40 in comparison to the comparative example.

Moreover, as illustrated in FIG. 2, in the vehicle front section structure 40, the bulkhead 62 is configured by a plate member straddling from the upright wall 44A to the upright wall 46A. The overall cross-section of the front side member 42 as viewed along the vehicle front-rear direction is accordingly utilized as a load transmission path, thereby enabling collision load to be stably transmitted toward the rear of the front side member 42, even when there is a change in the collision mode of the vehicle 10, such as a small overlap collision or a head-on collision.

Second Exemplary Embodiment

Next, explanation follows regarding a vehicle front section structure 70 according to a second exemplary embodiment.

The vehicle front section structure 70 according to the second exemplary embodiment is provided to the vehicle 10 according to the first exemplary embodiment illustrated in FIG. 1 in place of the vehicle front section structure 40. Note that configurations similar to those of the first exemplary embodiment are allocated the same reference numerals, and explanation thereof is omitted. A similar configuration is a concept encompassing configurations that have basically the same function, even when some lengths and shapes may differ.

Figure 7:
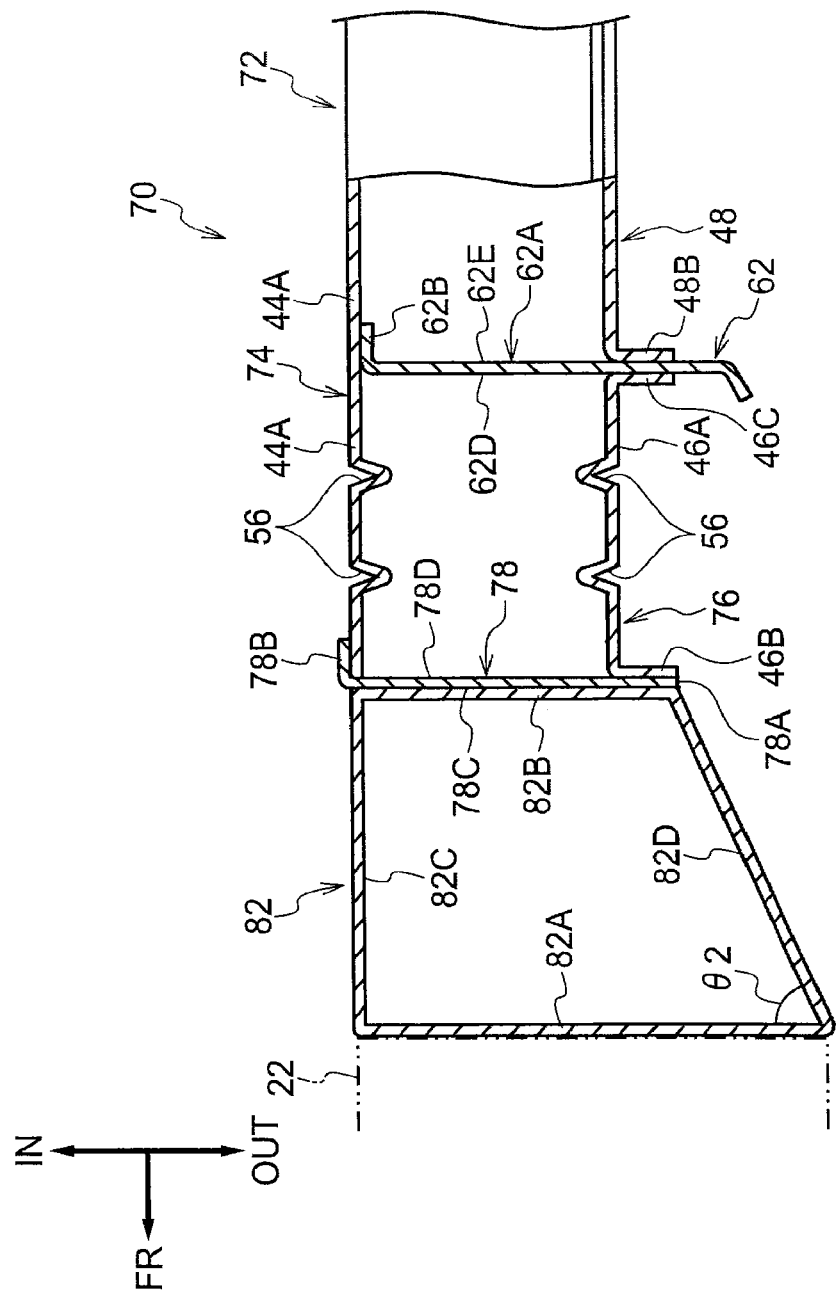
FIG. 7 is a partial horizontal cross-section of a vehicle front section structure according to a second exemplary embodiment.

As illustrated in FIG. 7, the vehicle front section structure 70 includes a front side member 72, a bracket 78 and a load receiving member 82 serving as a load receiving section, beads 56, and a bulkhead 62. Since the vehicle front section structure 70 is basically configured with left-right symmetry, explanation is given regarding the structure on the left side, and explanation regarding the structure on the right side is omitted. The crash box 22 is illustrated by double-dotted intermittent lines in FIG. 7.

Front Side Member

As illustrated in FIG. 7, the front side member 72 includes an inner panel 74 extending along the vehicle front-rear direction, and a first outer panel 76 and a second outer panel 48 positioned at the vehicle width direction outer side of the inner panel 74 and extending along the vehicle front-rear direction.

Inner Panel

The inner panel 74 is an example of an inner wall. The inner panel 74 has a similar configuration to the inner panel 44 of the first exemplary embodiment (see FIG. 2), with the exception that the length from the beads 56 to the vehicle front-rear direction front end is set shorter than in the inner panel 44. Namely, the beads 56 are formed at two locations of the upright wall 44A of the inner panel 74, at locations further to the vehicle front-rear direction front side than the bulkhead 62.

First Outer Panel

The first outer panel 76 is an example of an outer wall, and is positioned further to the vehicle front-rear direction front side than the second outer panel 48. The first outer panel 76 has a similar configuration to the first outer panel 46 of the first exemplary embodiment (see FIG. 2), with the exception that the length from the beads 56 to the vehicle front-rear direction front end is set shorter than in the first outer panel 46. Namely, the beads 56 are formed at two locations of the upright wall 46A of the first outer panel 76, at locations further to the vehicle front-rear direction front side than the bulkhead 62.

Note that although omitted from illustration in FIG. 7, an upper flange 44D and a lower flange 44E (see FIG. 3A) of the inner panel 74 are joined by welding to a vehicle up-down direction upper end portion and lower end portion of the first outer panel 76. Similarly, the upper flange 44D and the lower flange 44E are joined by welding to a vehicle up-down direction upper end portion and lower end portion of the second outer panel 48. The inner panel 74 and the first outer panel 76, and the inner panel 74 and the second outer panel 48, thereby form a closed cross-section extending along the vehicle front-rear direction.

Bracket

As illustrated in FIG. 7, the bracket 78 is, for example, configured by an upright wall 78A and a flange 78B. The upright wall 78A is formed by a rectangular plate member with its length direction along the vehicle width direction and with its short direction along the vehicle up-down direction as viewed along the vehicle front-rear direction.

The flange 78B extends from a vehicle width direction inner end portion of the upright wall 78A toward the vehicle front-rear direction rear side.

The length of the upright wall 78A in the vehicle width direction is a length that covers from the upright wall 44A to the front flange 46B. The length of the upright wall 78A in the vehicle up-down direction is a length that covers the upper flange 44F, the lower flange 44G (see FIG. 5), and the front flange 46B in an assembled state. A vehicle front-rear direction front side face of the upright wall 78A is referred to as a front face 78C, and a vehicle front-rear direction rear side face is referred to as a rear face 78D. The upper flange 44F, the lower flange 44G (see FIG. 5), and the front flange 46B are joined by welding to the rear face 78D.

Load Receiving Member

As illustrated in FIG. 7, for example, the load receiving member 82 is formed in a hollow box shape from steel sheet, and is provided at a vehicle front-rear direction front end portion of the front side member 72. Specifically, the load receiving member 82 is configured by a front wall 82A, a rear wall 82B, a right side wall 82C, a left side wall 82D, and an upper wall and lower wall, not illustrated in the drawings. The load receiving member 82 is formed in a trapezoidal shape as viewed along the vehicle up-down direction, and is formed in a rectangular shape as viewed along the vehicle front-rear direction.

The front wall 82A is formed in a plate shape running along the vehicle width direction and the vehicle up-down direction. The length of the front wall 82A in the vehicle width direction is, for example, longer than the length of the front end portion of the front side member 72 in the vehicle width direction. A rear end portion of the crash box 22 is joined to a vehicle front-rear direction front face of the front wall 82A.

The rear wall 82B is formed in a plate shape running along the vehicle width direction and the vehicle up-down direction, and is disposed further to the rear side than the front wall 82A, and at the front side of the bracket 78, in the vehicle front-rear direction. The length of the rear wall 82B in the vehicle width direction is, for example, substantially the same length as the length of the upright wall 78A in the vehicle width direction. A vehicle front-rear direction rear face of the rear wall 82B is joined to the front face 78C of the bracket 78.

The right side wall 82C is configured in a plate shape running along the vehicle front-rear direction and the vehicle up-down direction, and is formed from a vehicle width direction inner end portion of the front wall 82A to a vehicle width direction inner end portion of the rear wall 82B. The right side wall 82C is disposed on an extension line (not illustrated in the drawings) extending the upright wall 44A in the vehicle front-rear direction.

As viewed along the vehicle up-down direction, the left side wall 82D is disposed in a state angled toward the vehicle width direction inner side on progression from a vehicle width direction outer end portion of the front wall 82A toward the vehicle front-rear direction rear side. Namely, as viewed along the vehicle up-down direction, the left side wall 82D is disposed obliquely, at an angle θ2 with respect to the front wall 82A.

Bulkhead

The bulkhead 62 illustrated in FIG. 7 is disposed at a fold point (position set for instigating a folding mode) on the front side member 72. Similarly to in the first exemplary embodiment, the bulkhead 62 is joined to the upright wall 44A, the rear flange 46C, and the front flange 48B of the front side member 72. A vehicle width direction outer end portion of the upright wall 62A, and the bent portion 62C, of the bulkhead 62 project out further to the vehicle width direction outer side than the upright wall 46A, the rear flange 46C, and the front flange 48B.

Operation and Effects

Next, explanation follows regarding operation and effects of the vehicle front section structure 70 of the second exemplary embodiment.

In the vehicle front section structure 70 illustrated in FIG. 7, in a collision, collision load is input to the load receiving member 82 through the crash box 22 further to the vehicle width direction outer side than the front side member 72. The collision load is transmitted toward the vehicle front-rear direction rear side of the front side member 72 through the load receiving member 82, the bracket 78, and the front end portion of the front side member 72.

The beads 56 with lower rigidity are formed at the front side member 72 further to the vehicle front-rear direction rear side than the load receiving member 82, and further to the vehicle front-rear direction front side than the bulkhead 62 that is positioned at the fold point. Accordingly, the front side member 72 undergoes axial compression plastic deformation along the vehicle front-rear direction at the locations formed with the beads 56, absorbing energy of the collision load, prior to the folding mode occurring. Namely, in the vehicle front section structure 70 of the present exemplary embodiment, more energy absorption occurs from the time of the collision than in the comparative example described above.

Moreover, the beads 56 are formed not only to the first outer panel 76, but also to the inner panel 74, of the front side member 72. The beads 56 are accordingly more readily crushed in the vehicle front-rear direction in a collision, facilitating collision energy absorption, in comparison to configurations in which the beads 56 are only formed to the first outer panel 76. The vehicle front section structure 70 accordingly enables the amount of energy absorbed by the front side member 72 in a collision to be increased.

Then, when plastic deformation of the portion formed with the beads 56 progresses, a vehicle front-rear direction rear end portion and vehicle width direction outer end portion of the load receiving member 82 contacts the bulkhead 62. Then, similarly to the vehicle front section structure 40 of the first exemplary embodiment (see FIG. 2), the front side member 72 folds inwards. The front side member 72 that has folded inwards then contacts the power unit 16 (see FIG. 1), thereby transmitting collision load toward the vehicle width direction inner side, enabling deformation of the cabin 12 (see FIG. 1) to be prevented.

In the vehicle front section structure 70, the load receiving member 82 is a structure that is attached to the vehicle front-rear direction front side of the front side member 72. Accordingly, by modifying the vehicle front-rear direction length of the load receiving member 82, the vehicle front section structure 70 can be attached to various vehicles 10 (see FIG. 1) including the front side members 72 (for example types with different lengths in the vehicle front-rear direction).

Third Exemplary Embodiment

Next, explanation follows regarding a vehicle front section structure 90 according to a third exemplary embodiment.

The vehicle front section structure 90 according to the third exemplary embodiment is provided to the vehicle 10 according to the first exemplary embodiment illustrated in FIG. 1 in place of the vehicle front section structure 40. Note that configurations similar to those of the first and second exemplary embodiments are allocated the same reference numerals, and explanation thereof is omitted.

Figure 8:
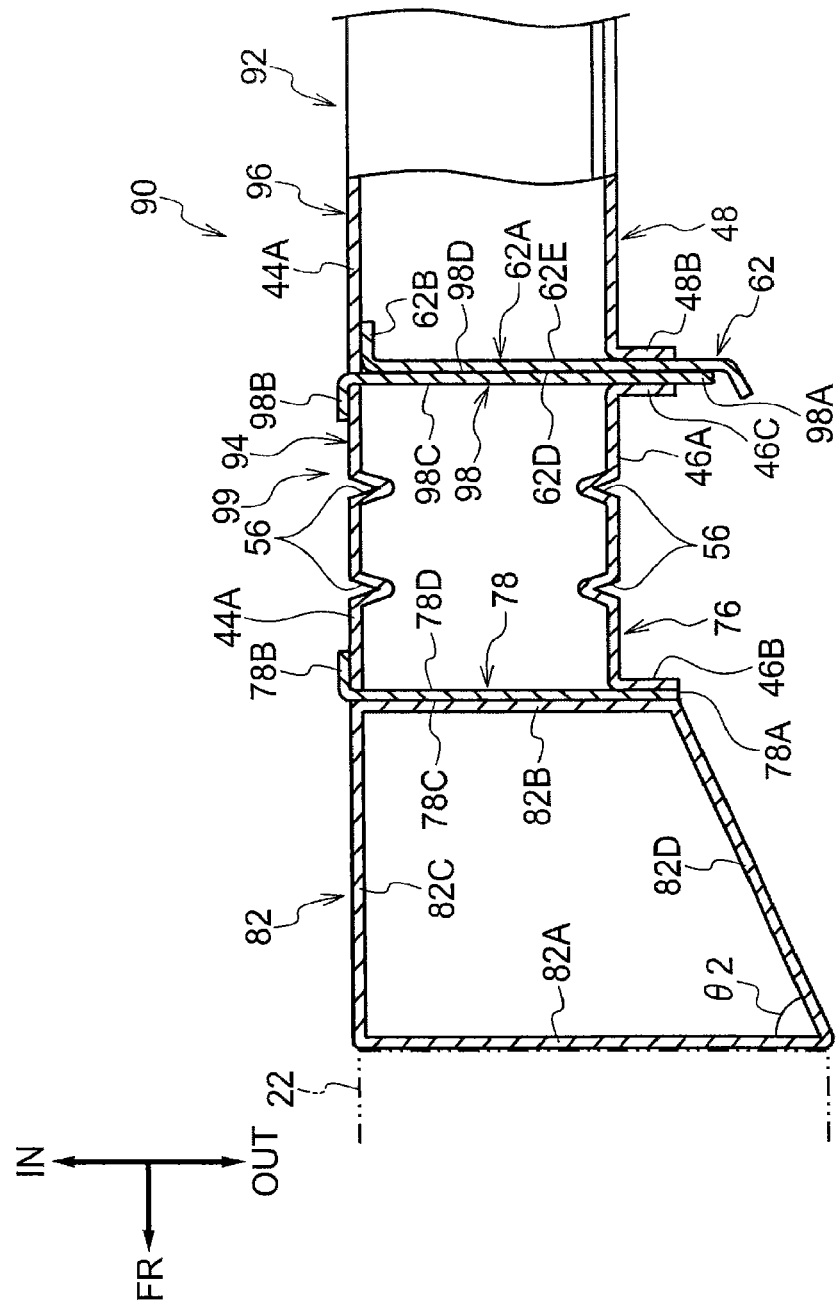
FIG. 8 is a partial horizontal cross-section of a vehicle front section structure according to a third exemplary embodiment.

As illustrated in FIG. 8, the vehicle front section structure 90 includes a front side member 92, a bracket 78 and a load receiving member 82, beads 56, and a bulkhead 62. The bulkhead 62 is positioned at a fold point of the front side member 92. Since the vehicle front section structure 90 is basically configured with left-right symmetry, explanation is given regarding the structure on the left side, and explanation regarding the structure on the right side is omitted. The crash box 22 is illustrated by double-dotted intermittent lines in FIG. 8.

Front Side Member

As illustrated in FIG. 8, the front side member 92 includes a first inner panel 94 and a second inner panel 96 extending along the vehicle front-rear direction, a first outer panel 76 and a second outer panel 48 extending along the vehicle front-rear direction, and a rear bracket 98.

First Inner Panel

The first inner panel 94 is positioned further to the front side than the second inner panel 96 in the vehicle front-rear direction. The first inner panel 94 is an example of an inner wall. The first inner panel 94 is configured similarly to the inner panel 44 of the first exemplary embodiment (see FIG. 2), with the exception that the length of the first inner panel 94 in the vehicle front-rear direction is substantially the same length as the length of the first outer panel 76 in the vehicle front-rear direction. The beads 56 are formed at an upright wall 44A of the first inner panel 94 at two locations, so as to protrude out toward the vehicle width direction outer side at an interval in the vehicle front-rear direction.

Second Inner Panel

The second inner panel 96 is configured similarly to the inner panel 44 of the first exemplary embodiment (see FIG. 2), with the exception that the length of the second inner panel 96 in the vehicle front-rear direction is substantially the same length as the length of the second outer panel 48 in the vehicle front-rear direction. Namely, the second inner panel 96 includes an upper flange 44F, a lower flange 44G (see FIG. 5), and a front flange 48B. An upright wall 44A of the second inner panel 96 and the upright wall 44A of the first inner panel 94 are disposed in a row along a straight line in the vehicle front-rear direction.

First Outer Panel

The first outer panel 76 is an example of an outer wall. The first outer panel 76 is positioned on the vehicle width direction outer side of the first inner panel 94, and is disposed facing the first inner panel 94 in the vehicle width direction.

Second Outer Panel

The second outer panel 48 is positioned on the vehicle width direction outer side of the second inner panel 96, and is disposed facing the second inner panel 96 in the vehicle width direction.

Rear Bracket

As illustrated in FIG. 8, the rear bracket 98 is an example of a dividing member dividing the inner wall and the outer wall of the front side member 92 into a front side and a rear side in the vehicle front-rear direction. Specifically, the rear bracket 98 divides the front side member 92 into the first inner panel 94, the second inner panel 96, the first outer panel 76, and the second outer panel 48. The rear bracket 98 is configured by an upright wall 98A and a flange 98B.

As viewed along the vehicle front-rear direction, the upright wall 98A is configured in a rectangular plate shape with its length direction in the vehicle width direction and its short direction in the vehicle up-down direction. The flange 98B extends from a vehicle width direction inner end portion of the upright wall 98A toward the vehicle front-rear direction front side.

The length of the upright wall 98A in the vehicle width direction is a length that covers from the upright wall 44A to the front flange 48B. The length of the upright wall 98A in the vehicle up-down direction is a length that covers the upper flange 44F, the lower flange 44G (see FIG. 5), and the front flange 48B in an assembled state. A vehicle front-rear direction front side face of the upright wall 98A is referred to as a front face 98C, and a vehicle front-rear direction rear side face is referred to as a rear face 98D.

Box Body

As illustrated in FIG. 8, the front face 98C of the rear bracket 98 is joined to a rear end face of the first inner panel 94 and to the rear flange 46C of the first outer panel 76. A rear face 78D of the bracket 78 is joined to a front end face of the first inner panel 94 and to a front flange 46B of the first outer panel 76. A box body 99 is thus formed, enclosed by the first inner panel 94, the first outer panel 76, the bracket 78, and the rear bracket 98.

During assembly of the vehicle front section structure 90, the flange 62B of the bulkhead 62 is joined to a vehicle width direction outer portion of the upright wall 44A of the second inner panel 96, and the rear face 62E of the bulkhead 62 is joined to the front flange 48B. The rear face 98D of the box body 99 is joined to the front end face of the upright wall 44A of the second inner panel 96 and a front face 62D of the bulkhead 62. The rear wall 82B of the load receiving member 82 is joined to the front face 78C of the box body 99. Moreover, the rear end portion of the crash box 22 is joined to the front wall 82A of the load receiving member 82. The vehicle front section structure 90 is assembled in this manner.

Operation and Effects

Next, explanation follows regarding operation and effects of the vehicle front section structure 90 of the third exemplary embodiment.

In a collision, in the vehicle front section structure 90 illustrated in FIG. 8, collision load is input to the load receiving member 82 through the crash box 22, further to the vehicle width direction outer side than the front side member 92. The collision load is transmitted toward the vehicle front-rear direction rear side of the front side member 92 through the load receiving member 82 and the box body 99.

The beads 56 are formed to the front side member 92 further to the vehicle front-rear direction rear side than the load receiving member 82, and further to the vehicle front-rear direction front side than the bulkhead 62 positioned at the fold point. Accordingly, the front side member 92 undergoes axial compression plastic deformation along the vehicle front-rear direction at the locations formed with the beads 56, absorbing energy of the collision load, prior to the folding mode occurring. Namely, in the vehicle front section structure 90 of the present exemplary embodiment, more energy absorption occurs from the time of the collision than in the comparative example described above.

Moreover, the beads 56 are formed not only to the first outer panel 76, but also to the first inner panel 94. The beads 56 are accordingly more readily crushed in the vehicle front-rear direction in a collision, facilitating collision energy absorption, in comparison to configurations in which the beads 56 are only formed to the first outer panel 76. The vehicle front section structure 90 accordingly enables the amount of energy absorbed by the front side member 92 in a collision to be increased due to absorbing energy from an early stage in a collision and facilitating energy absorption.

Then, when plastic deformation of the portion of the box body 99 formed with the beads 56 progresses, a vehicle front-rear direction rear end portion and vehicle width direction outer end portion of the load receiving member 82 contacts the bulkhead 62. Then, similarly to the vehicle front section structure 40 of the first exemplary embodiment (see FIG. 2), the front side member 92 folds inwards. The front side member 92 that has folded inwards then contacts the power unit 16 (see FIG. 1), thereby transmitting collision load toward the vehicle width direction inner side, enabling deformation of the cabin 12 (see FIG. 1) to be prevented.

In the vehicle front section structure 90, the box body 99 is attached to the vehicle front-rear direction front side of the front side member 92. The vehicle front section structure 90 can be attached to various vehicles 10 (see FIG. 1) including the front side members 92 (for example types with different lengths in the vehicle front-rear direction) by modifying not only the load receiving member 82, but also the vehicle front-rear direction length of the box body 99.

Next, explanation follows regarding modified examples of the vehicle front section structure that may be employed in the respective exemplary embodiments described above.

First Modified Example

Figure 9A:
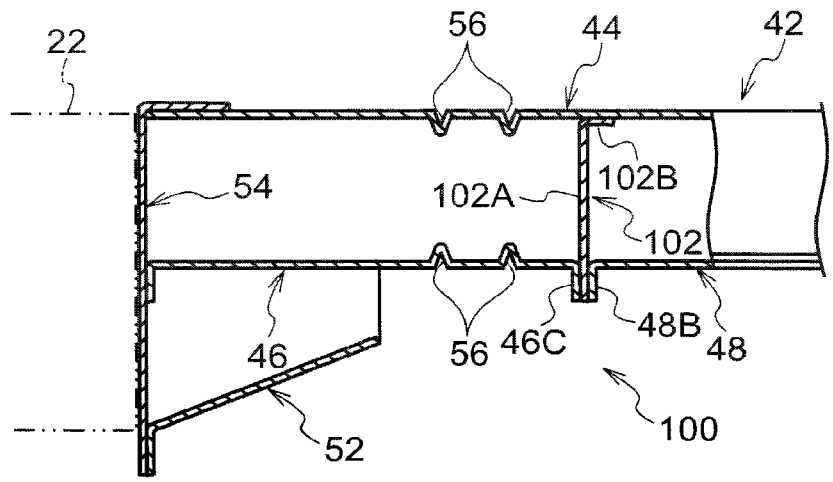
FIG. 9A is a partial horizontal cross-section of a vehicle front section structure according to a first modified example.

FIG. 9A illustrates a vehicle front section structure 100, serving as a first modified example. The vehicle front section structure 100 is provided with a bulkhead 102, serving as an example of a reinforcement portion, in place of the bulkhead 62 (see FIG. 2) in the vehicle front section structure 40 (see FIG. 2) of the first exemplary embodiment. The bulkhead 102 is configured by a plate member formed in an L shape in plan view, and includes an upright wall 102A, and a flange 102B extending from a vehicle width direction inner end portion of the upright wall 102A toward the vehicle front-rear direction rear side.

The upright wall 102A is provided straddling from the inner panel 44 to the first outer panel 46 and the second outer panel 48 in the vehicle width direction. However, the upright wall 102A does not extend further to the outer side than the rear flange 46C and the front flange 48B in the vehicle width direction. A configuration employing the bulkhead 102 that has a shorter length in the vehicle width direction than the bulkhead 62 (see FIG. 2) also has a location with higher rigidity at the location provided with the bulkhead 102 than at locations not provided with the bulkhead 102. This thereby enables the front side member 42 to be folded inward about a fold point at the location provided with the bulkhead 102, following energy absorption by the beads 56.

Second Modified Example

Figure 9B:
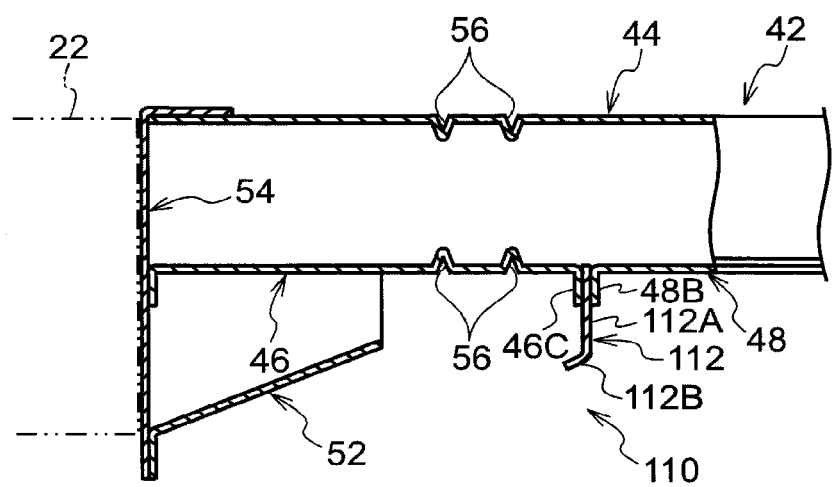
FIG. 9B is a partial horizontal cross-section of a vehicle front section structure according to a second modified example.

FIG. 9B illustrates a vehicle front section structure 110, serving as a second modified example. The vehicle front section structure 110 is configured provided with a bulkhead 112, serving as an example of a reinforcement portion, in place of the bulkhead 62 (see FIG. 2) in the vehicle front section structure 40 (see FIG. 2).

The bulkhead 112 includes an upright wall 112A, and a bent portion 112B extending in an oblique direction from a vehicle width direction outer end portion of the upright wall 112A toward the vehicle front-rear direction front side. The upright wall 112A extends along the vehicle width direction from the first outer panel 46 and the second outer panel 48 to further to the outer side than the rear flange 46C and the front flange 48B. The bulkhead 112 is not provided between the inner panel 44, and the first outer panel 46 and the second outer panel 48.

Even in this configuration in which the bulkhead 112 does not straddle from the inner panel 44 to the first outer panel 46 and the second outer panel 48, there is a location with higher rigidity at the location where the bulkhead 112 is provided than at locations not provided with the bulkhead 112. This thereby enables the front side member 42 to be folded inward about a fold point at the location provided with the bulkhead 112, following energy absorption by the beads 56.

Third Modified Example

Figure 9C:
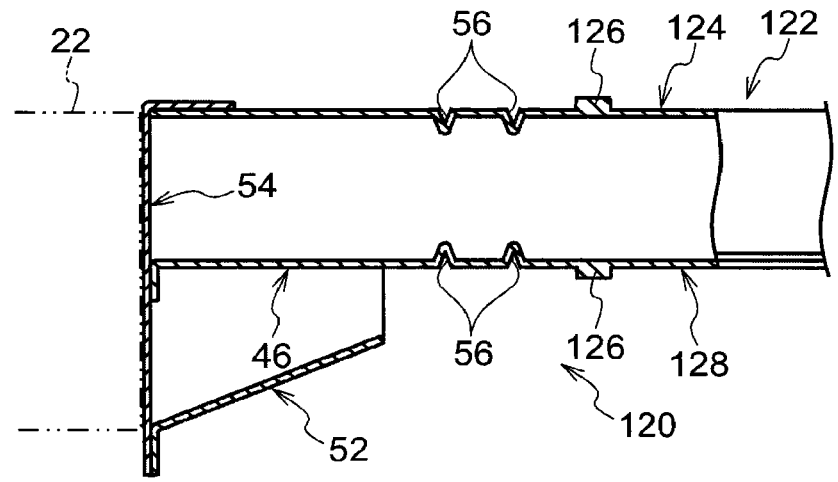
FIG. 9C is a partial horizontal cross-section of a vehicle front section structure according to a third modified example.

FIG. 9C illustrates a vehicle front section structure 120, serving as a third modified example. The vehicle front section structure 120 includes a front side member 122, a gusset 52, and a bracket 54. The front side member 122 includes an inner panel 124 and an outer panel 128. The gusset 52 is joined to a vehicle front-rear direction front end portion and vehicle width direction outer side of the outer panel 128. The bracket 54 is joined to the front side member 122 and to a vehicle front-rear direction front end portion of the gusset 52.

The inner panel 124 runs along the vehicle front-rear direction. As viewed along the vehicle front-rear direction, the inner panel 124 is formed in a hat shape opening toward the vehicle width direction outer side. The inner panel 124 is formed with the beads 56 protruding out toward the vehicle width direction outer side, at a rear side in the vehicle front-rear direction than the gusset 52. Moreover, a thickened portion 126, serving as an example of a reinforcement portion projecting out toward the vehicle width direction inner side and thicker than other locations, is formed to the inner panel 124 at a rear side in the vehicle front-rear direction than the beads 56.

The outer panel 128 runs along the vehicle front-rear direction, and is disposed facing the inner panel 124 in the vehicle width direction. The outer panel 128 is formed with the beads 56 protruding out toward the vehicle width direction inner side and is located at the rear side than the gusset 52 in the vehicle front-rear direction. A thickened portion 126 projecting out toward the vehicle width direction outer side and thicker than other locations is formed to the outer panel 128, at a rear side in the vehicle front-rear direction than the beads 56.

Thus, the thickened portions 126 form a location with higher rigidity than other locations, even in a configuration without the bulkhead 62 (see FIG. 2). This thereby enables the front side member 122 to be folded inward about a fold point at the location formed with the thickened portions 126 following energy absorption by the beads 56.

Fourth Modified Example

Figure 10A:
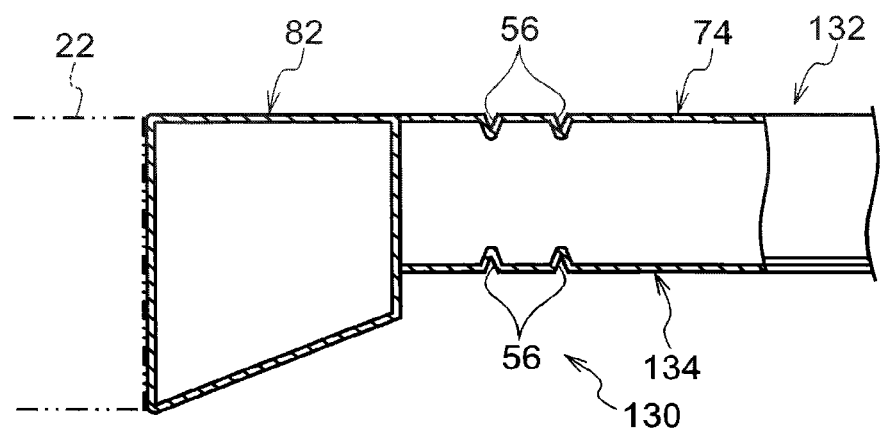
FIG. 10A is a partial horizontal cross-section of a vehicle front section structure according to a fourth modified example.

FIG. 10A illustrates a vehicle front section structure 130, serving as a fourth modified example. The vehicle front section structure 130 includes a front side member 132 and the load receiving member 82. The front side member 132 includes an inner panel 74 and an outer panel 134. The load receiving member 82 is joined to a vehicle front-rear direction front end portion of the front side member 132.

The outer panel 134 runs along the vehicle front-rear direction, and is disposed facing the inner panel 74 in the vehicle width direction. The outer panel 134 is formed with the beads 56 protruding out toward the vehicle width direction inner side and facing the beads 56 formed to the inner panel 74 in the vehicle width direction. The inner panel 74 and the outer panel 134 are not provided with the bulkhead 62 (see FIG. 2), nor are there any thickened portions 126 (see FIG. 9C) further to the rear side than the beads 56 in the vehicle front-rear direction.

Even in such a configuration omitting the bulkhead 62 (see FIG. 2) and the thickened portions 126 (see FIG. 9C), there are locations of the front side member 132 formed with the weak beads 56, and locations with higher rigidity than the beads 56. This thereby enables the front side member 132 to be folded inward about a fold point at the location further to the vehicle front-rear direction rear side than the beads 56 following energy absorption by the beads 56

Fifth Modified Example

Figure 10B:
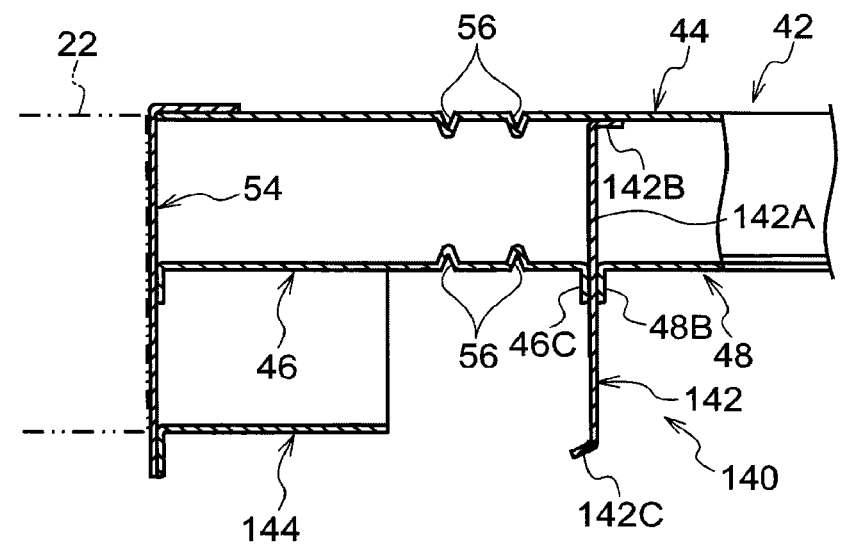
FIG. 10B is a partial horizontal cross-section of a vehicle front section structure according to a fifth modified example.

FIG. 10B illustrates a vehicle front section structure 140, serving as a fifth modified example. The vehicle front section structure 140 includes the front side member 42, a bulkhead 142, a gusset 144, and the bracket 54.

The bulkhead 142 includes an upright wall 142A, a flange 142B extending from a vehicle width direction inner end portion of the upright wall 142A toward the vehicle front-rear direction rear side, and a bent portion 142C extending in an oblique direction from a vehicle width direction outer end portion of the upright wall 142A, toward the vehicle front-rear direction front side. The upright wall 142A extends in the vehicle width direction from the inner panel 44 to further to the outer side than the front flange 46B and the front flange 48B. Namely, the bulkhead 142 straddles from the inner panel 44, to the first outer panel 46 and the second outer panel 48. The flange 142B is joined to the inner panel 44.

The gusset 144 is formed in a hat shape, opening toward the vehicle width direction inner side as viewed along the vehicle front-rear direction. The gusset 144 is formed in a rectangular shape in plan view, with its length direction in the vehicle front-rear direction and with its short direction in the vehicle width direction. Even in the configuration employing the gusset 144 that is rectangular (a quadrilateral shape) in plan view, the gusset 144 contacts the bulkhead 142 following energy absorption by the beads 56, thereby enabling the front side member 42 to be folded inward.

OTHER MODIFIED EXAMPLES

The beads 56 may be formed to the upper wall 44B and the lower wall 44C as well as the upright walls 44A, 46A. There is no limitation to forming the beads 56 with a substantially V shaped cross-section profile in plan view, and the beads 56 may have a circular arc shaped cross-section profile or a polygonal shaped cross-section profile. Plural of the beads 56 may be formed along the vehicle up-down direction. Moreover, the number of the beads 56 in the vehicle front-rear direction is not limited to two, and one, or three or more, may be formed. In cases in which plural of the beads 56 are formed in the vehicle front-rear direction, their respective rigidity with respect to collision load acting in the vehicle front-rear direction may differ. Moreover, a front side member may be formed with a low rigidity and a high rigidity location by forming weakened portions, and a reinforcement portion need not be provided in configurations that instigate a folding mode at the high rigidity location.

There is no limitation to the load receiving section being one that is provided to a vehicle front-rear direction front end portion of the front side member 42, as with the gusset 52 and the bracket 54, and the load receiving section may be formed directly to the front end portion of the front side member 42. For example, an enlarged width portion having an enlarged width in the vehicle width direction may be formed at the front end portion of the front side member 42.

There is no limitation to the load receiving member 82 being one that is attached to the vehicle front-rear direction front end face of the front side member 72. For example, the load receiving member may be one that is joined to a vehicle width direction outer face of the upright wall 44A of the inner panel 74 and the front flange 46B of the first outer panel 76.

The gussets 52, 144 are not limited to being one that is a trapezoidal shape or a rectangular shape in plan view, and may be formed with a triangular shape or other polygonal shape in plan view.

The bulkhead 62, 102, 112, 142 may be formed in a flat plate shape running along the vehicle width direction, without forming the bent portion 62C, 112B, 142C at a vehicle width direction outer end portion.

In the vehicle front section structure 130, the load receiving member 82 may be omitted, with a vehicle front-rear direction front end portion of the front side member 132 increased in width toward the vehicle width direction outer side. Configuration may also be made in which the load receiving member 82 is omitted and a vehicle front-rear direction front end portion of the front side member 132 is not increased in width toward the vehicle width direction outer side.

Explanation has been given regarding vehicle front section structures according to a first, second, and third exemplary embodiment, as well as respective modified examples. However, it goes without saying that these exemplary embodiments and modified examples may be employed in appropriate combinations, and various configurations may be implemented within a range not departing from the spirit of the disclosure.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A vehicle front section structure comprising:
   a front side member including an inner wall and an outer wall facing each other in a vehicle width direction;
   a load receiving section that is connected to an outer side of a vehicle front-rear direction front end portion of the front side member, and that receives load;
   a weakened portion that is formed at least in the inner wall and the outer wall, at a location that is more rearward in a vehicle front-rear direction of the front side member than the load receiving section, and that has lower rigidity than the rigidity of other locations in the front side member; and
   a reinforcement portion having higher rigidity than the rigidity of the weakened portion and that is disposed at a location that is more rearward in the vehicle front-rear direction of the front side member than the weakened portion,
   wherein the load receiving section has a greater width in the vehicle width direction than the front side member; and the reinforcement portion includes a contact member that projects out from the outer wall to a vehicle width direction outer side, and that contacts the load receiving section in a collision.

2. The vehicle front section structure of claim 1, wherein the reinforcement portion is a plate member straddling from the inner wall to the outer wall.

3. The vehicle front section structure of claim 1, wherein the load receiving section is disposed at the vehicle width direction outer side of the outer wall, and includes a gusset formed in a trapezoidal shape in plan view with an upper base at a vehicle front-rear direction rear side, and a lower base at a vehicle front-rear direction front side.

4. The vehicle front section structure of claim 1, wherein the load receiving section includes a load receiving member that is formed in a hollow box shape and that is disposed at the front end portion of the front side member.

5. The vehicle front section structure of claim 1, wherein:
the front side member includes a dividing member that respectively divides the inner wall and the outer wall into a front side and a rear side in the vehicle front-rear direction;
the weakened portion is formed at the inner wall at the front side and the outer wall at the front side; and
a box body is formed by the inner wall at the front side, the outer wall at the front side, the load receiving section, and the dividing member.

* * * * *